United States Patent [19]

Kaivosoja

[11] Patent Number: 5,664,025
[45] Date of Patent: Sep. 2, 1997

[54] APPARATUS FOR THE QUALITY CONTROL OF A PRINT PRODUCED BY A PRINTING MACHINE

[75] Inventor: Juhani Kaivosoja, Helsinki, Finland

[73] Assignee: Insinööritoimisto Data Oy, Finland

[21] Appl. No.: 411,811

[22] Filed: Apr. 10, 1995

[30] Foreign Application Priority Data

Oct. 16, 1992 [FI] Finland ................ 924686

[51] Int. Cl.⁶ .................................................. G06K 9/00
[52] U.S. Cl. .................. 382/112; 356/429; 250/559.4
[58] Field of Search ................ 382/112, 100; 250/559–563, 571–574; 356/429–431; 348/88, 92

[56] References Cited

U.S. PATENT DOCUMENTS

| | | | |
|---|---|---|---|
| 4,561,103 | 12/1985 | Horiguchi et al. | 382/1 |
| 4,567,506 | 1/1986 | Shinoda et al. | 358/11 |
| 4,630,276 | 12/1986 | Moran | 372/15 |
| 4,667,247 | 5/1987 | Karow | 382/112 |
| 4,775,238 | 10/1988 | Weber | 356/431 |
| 5,079,434 | 1/1992 | Weber | 250/572 |
| 5,125,037 | 6/1992 | Lehtonen et al. | 382/112 |
| 5,305,392 | 4/1994 | Longest, Jr. et al. | 382/112 |

FOREIGN PATENT DOCUMENTS

| | | |
|---|---|---|
| 3734294 | 4/1989 | Germany. |
| 3926349 | 2/1991 | Germany. |
| 440406 | 7/1985 | Sweden. |
| 2108283 | 5/1983 | United Kingdom. |

*Primary Examiner*—Leo Boudreau
*Assistant Examiner*—Bhavesh Mehta
*Attorney, Agent, or Firm*—Rothwell, Figg, Ernst & Kurz, P.C.

[57] ABSTRACT

The invention relates to an apparatus for the quality control of a print produced by a printing machine. The apparatus includes a CCD camera and a measuring girder, extending substantially across the width of a printing surface to be controlled. A path of light coming from a printing surface to the camera is provided with mirrors arranged in a manner such that the light of said path reflects from the mirrors several times, whereby the distance covered by the light coming from a printing surface to camera is a multiple when compared to the distance between the camera and the printing surface. The mirrors can be used for "packing" the control apparatus into a compact size, and yet it is possible to employ a standard CCD line camera as the measuring head. The apparatus is particularly suitable for the quality control of newspaper printing.

11 Claims, 4 Drawing Sheets

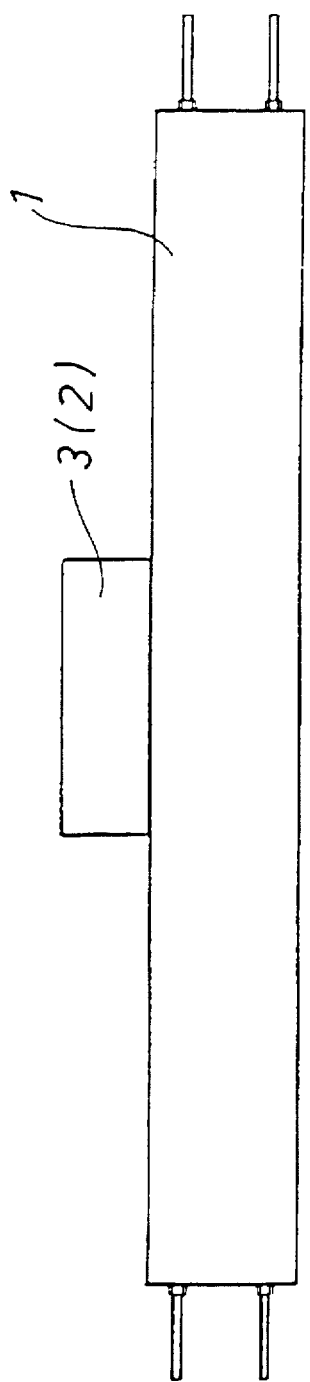 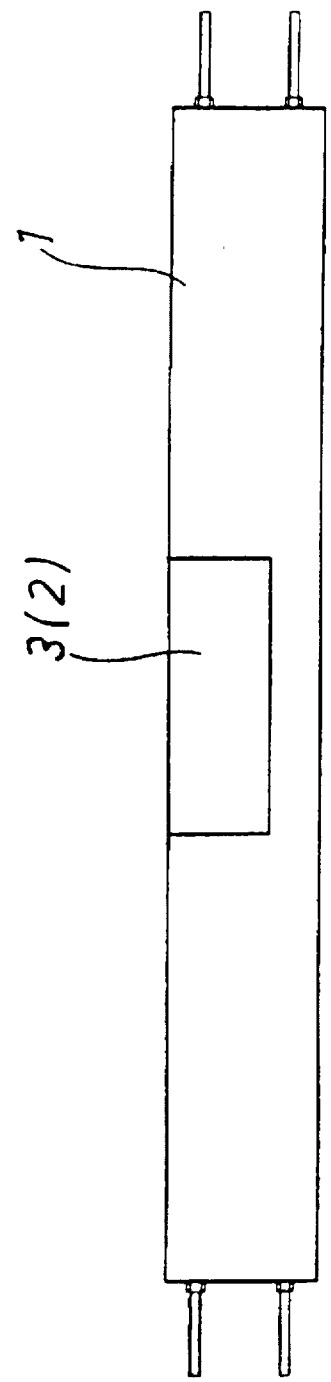 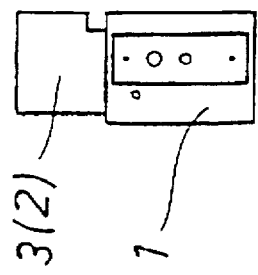 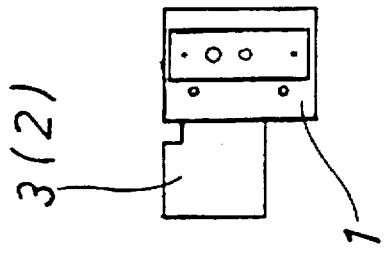
Fig. 3
Fig. 4

APPARATUS FOR THE QUALITY CONTROL OF A PRINT PRODUCED BY A PRINTING MACHINE

BACKGROUND OF THE INVENTION

The present invention relates to an apparatus for the quality control of a print produced by a printing machine. The apparatus comprises a CCD camera and a measuring girder having a length which essentially covers the width of a printing surface to be controlled.

A problem in the printing industry and especially in newspaper printing is the quality control of printed matter from a high-speed web of paper. In newspaper production, a paper emerges as a finished product from a printing machine and, thus, it cannot be checked afterwards except by picking up the product and glancing through it.

Quality problems result from malfunctions occurring in the watering or inking device of an offset printing machine, such as accumulation of paper dust in pipe systems, mechanical and electrical malfunctions or just inadequate maintenance. A reader experiences the quality problems as poor quality printing either in part of a page or in several pages. The problem becomes even more pronounced if a poor quality page carries a sizable advertisement or several advertisements since advertisments represent a major source of income for a newspaper.

In so-called roll-to-roll printing machines, the printing industry has earlier employed a web inspection device which was based on a rotating mirror polygon which, upon rotating at a correct speed, brought the web to a halt for inspection. Such a device required an operating person and was therefore only used for occasional inspection. At present, this application has been replaced by a CCD camera, which snatches an image of a web of paper onto a colour monitor to be inspected by a printer. There are also measuring girders carrying a plurality of CCD cameras side by side and measuring girders effecting the measurement by means of separate optical transducers.

These products as such are good but expensive. A newspaper printing machine usually includes one to six webs of paper, whereby the number of such measuring devices should be twice that of the webs as a newspaper page is printed on both sides. The existing products are difficult to apply for measuring a wide web of paper as there will be a long distance between the camera and the object to be measured. In a heavy-duty printing machine there is very little space available and hence, in addition to being inexpensive, the product must also be sufficiently small. The environmental aspects of a printing machine are also demanding: the conditions are humid (even wet) and temperature may rise up to 30° C.

SUMMARY OF THE INVENTION

An object of the invention is to provide such a competitively priced product for resolving the above technical problem which fulfills the spatial and environmental requirements set by a printing machine.

This object is achieved by means of a measuring bar according to the characterizing features set forth in the annexed claim 1.

BRIEF DESCRIPTION OF THE DRAWINGS

The invention will now be described in more detail with reference made to the accompanying drawings, in which

FIG. 3 shows a plan view and an end view of the measuring girder of FIG. 1;

FIG. 4 shows a plan view and an end view of the measuring girder of FIG. 2;

Figure 1:
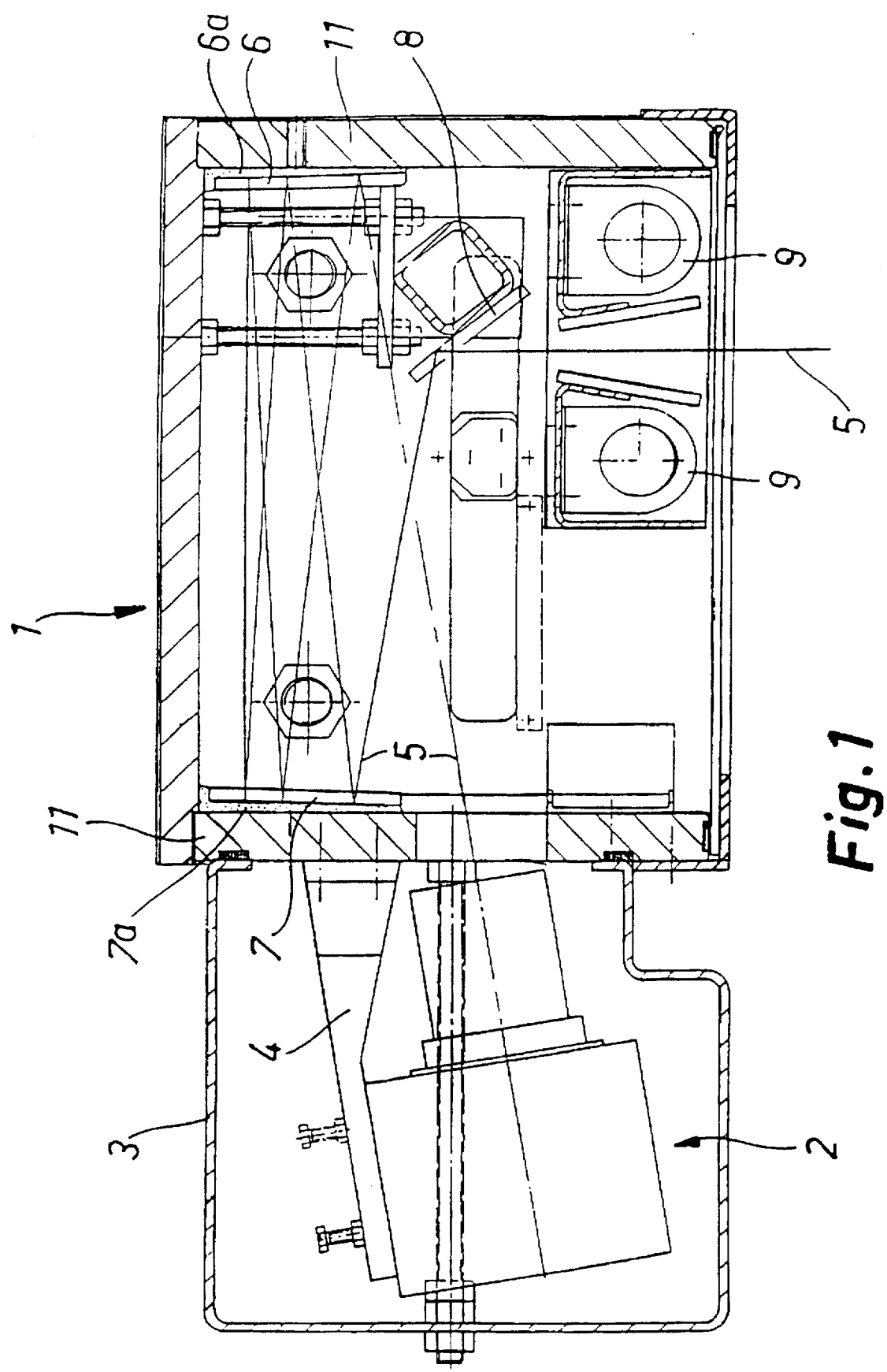
FIG. 1 shows a measuring girder according to a first embodiment of the invention in cross-section.

A measuring girder 1 of the invention is provided with a CCD line camera 2 for measuring darkness variations in the printing surface of a moving web of paper.

The CCD camera 2 includes e.g. 1024 measuring elements for measuring a moving web transversely to the traveling direction. Camera 2 can be optionally provided with a CCD circuit of 2500 elements, making it capable of measuring yet smaller details. The light source illuminating a printing surface to be controlled is provided by fluorescence tubes 9 operated at a frequency of 30 kHz. The light of fluorescence tubes covers the range of visible light sufficiently well, the IR radiation thereof is low and 30 kHz brings the disturbance level sufficiently low.

The optical distance from a measuring object, i.e. the distance between a printing surface and a CCD camera, is achieved by means of surface and normal mirrors. The path of light traveling from a printing surface to camera 2 is provided with mirrors 6, 7, 8 which are positioned such that the light of said path 5 reflects from the mirrors several times, whereby the distance covered by the light traveling from printing surface to camera is a multiple compared to the distance between the camera and the printing surface. Since the light reflected from a measuring object "ricochets" between mirrors 6 and 7 several times, it will travel a distance required for covering a sufficiently wide measuring range by means of camera 2. This detail provides the actual invention. The use of mirrors is an inexpensive way of "packing" a measuring apparatus into a compact size and yet of using a standard CCD line camera as the measuring head.

The assembly requires a sturdy framework for the optics to operate properly. The framework is made e.g. of aluminium, which is pressed to a predetermined profile. The main mirrors 6 and 7 are glued to side walls 11 of a girder opposite to each other by means of a special jig, the thickness of adhesive layers 6a, 7a being determined such that mirrors 6, 7 set at a proper angle. There is an angular variation of 2–5 degrees between the alignments of the mirrors for producing said reciprocal reflection occurring several times between the mirrors. Reference numeral 5 is used to designate a path of light from a printing surface to a line produced by CCD elements included in the camera. The reading range of camera 2 can be adjusted by adjusting the camera and by means of one or two mirrors 8 and 10 depending on which side of the girder the camera is to be mounted.

Figure 2:
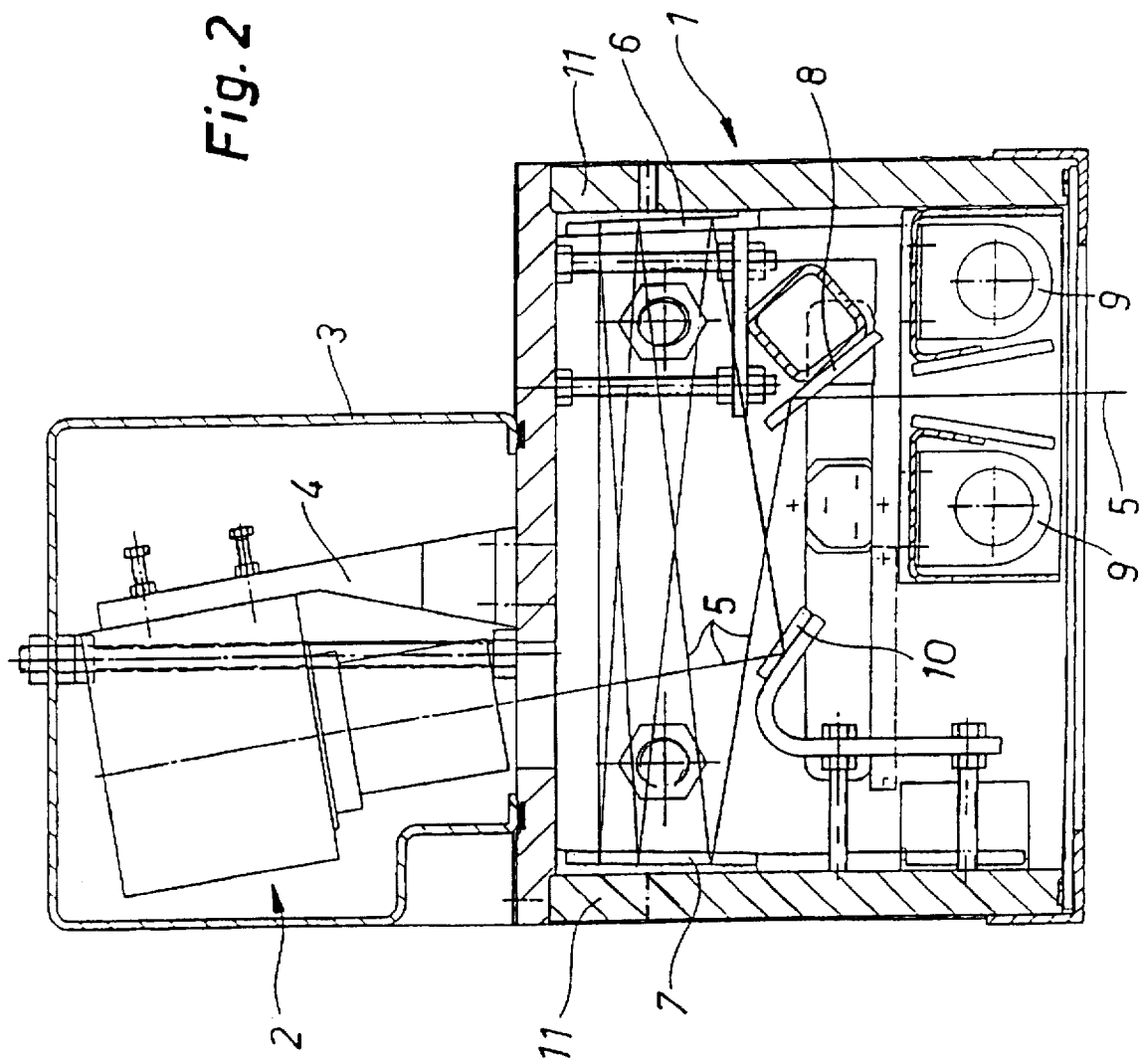
FIG. 2 shows a measuring girder according to a second embodiment of the invention in cross-section.

In the embodiment of FIGS. 1 and 3, said camera 2 is mounted alongside girder 1 below a protective hood 3 for easy maintenance of the camera. If the available space does not allow the mounting of a camera alongside a girder, it can be mounted on top of a girder, as shown in the embodiment of FIGS. 2 and 4. This requires one more mirror 10. The girder is sealed and a window for reading the degree of darkness of a print on a web of paper is maintained clean with compressed air.

In the embodiment of FIGS. 1 and 2, the alignment or direction of mirrors 6 and 7 deviates by 1.6 degrees from the vertical plane. The mirror 8 is set in a manner such that the path 5 between itself and mirror 7 deviates by appr. 10 degrees from the horizontal plane. With this arrangement the light path 5 can be made sufficiently long for mounting a standard production CCD line camera directly on measuring girder 1 without any substantial spacing between girder and camera.

Figure 5:
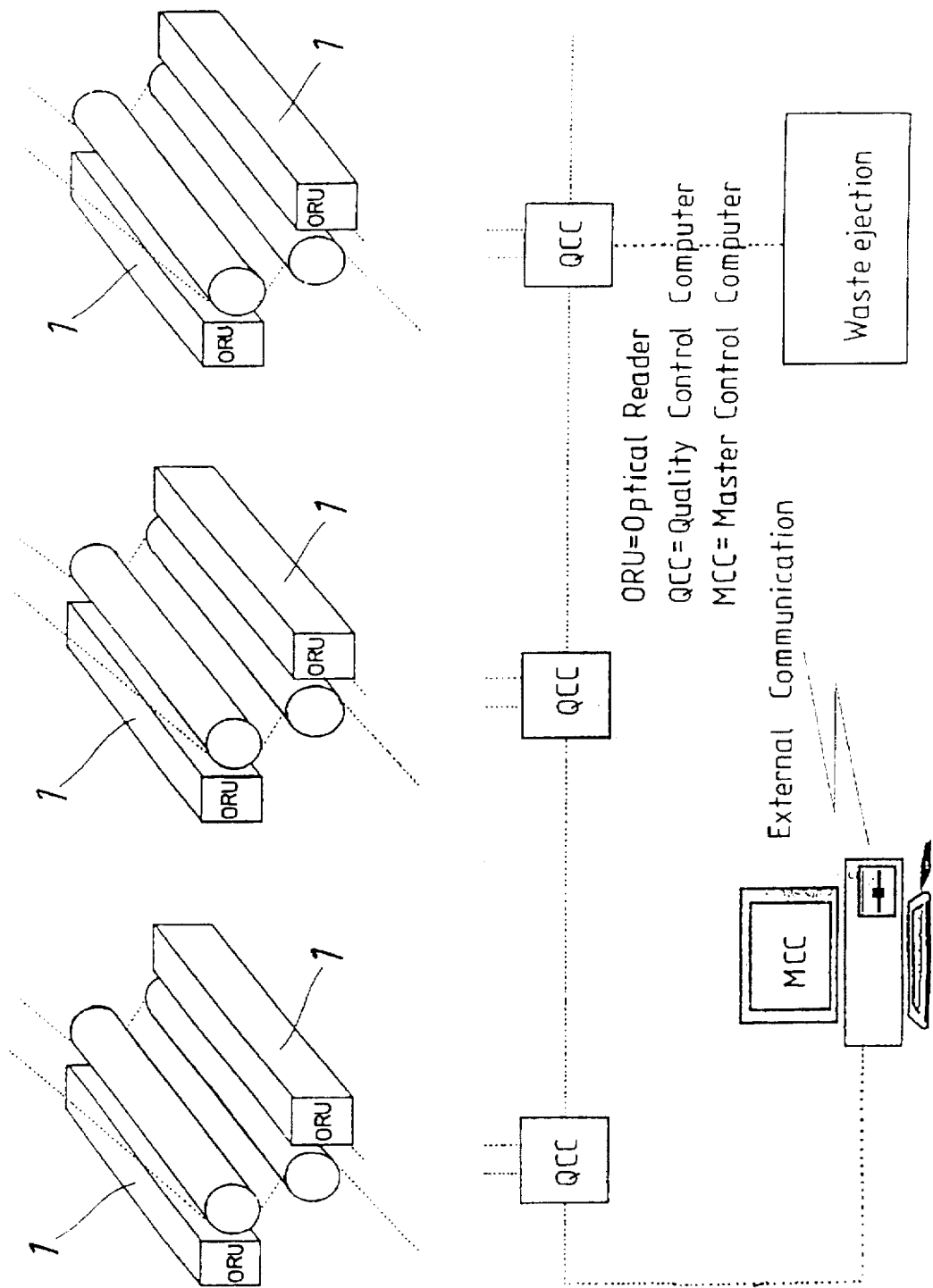
FIG. 5 shows a diagrammatic view of an apparatus assembly for using the measuring girders of the invention in newspaper printing for controlling the quality of print.

The data processing is carried out in a micro-computer QCC (FIG. 5) mounted outside the girder in the vicinity of girder 1. A single computer QCC is capable of processing the measuring results of two measuring girders 1. Up to 16 units of micro-computers can be connected in series. The control thereof is effected by way of a master computer, which is a standard PC type 386 SX. The communication between computers QCC occurs along an RS485 path employing a single twin wire.

The apparatus measures normally a 1-2 mm wide zone/measuring element, depending on the web width. The computer QCC sums up a plurality of adjacent zones, the total number of which is used for calculating an average. The operator gives an acknowledgement to the apparatus upon verifying that the product is of good quality. The apparatus stores the data as reference information in a memory. If the quality of print decreases below an accepted fluctuation range (which is adjustable), the apparatus produces an alarm or takes predetermined actions.

Although the apparatus is specifically developed for the quality control of a newspaper print, a measuring girder of the invention can be used for several other purposes both in the printing industry and elsewhere. The printing surface to be monitored can be on paper, cardboard, plastic film, aluminium foil or printing plate. The basic requirement is that a target or an object to be measured is in motion relative to the measuring apparatus or, respectively, the measuring apparatus is in motion.

The measuring accuracy depends on the traveling speed of a controlled printing surface relative to a camera and on the exposure time of a camera, the latter in turn depending on lighting conditions. A normal speed range is 1-13 m/s but it can also be slower or faster.

I claim:

1. An apparatus for the quality control of a print produced by a printing machine, said apparatus comprising a CCD line camera having a length which substantially covers the width of a printing surface to be controlled, characterized in that said CCD line camera has photosensitive elements which produce a line which is many times shorter than the effective controlling length of the girder and is mounted directly on said measuring girder without an essential spacing between said girder and said camera, and that a path of light traveling from a printing surface to camera, on opposite side walls of said girder, is provided with mirrors, located opposite to each other and having an angular variation whereby the light of said path reflects several times between said mirrors, and that a third mirror deflects the light coming from a printing surface to one of said two opposite mirrors.

2. An apparatus as set forth in claim 1, wherein the measuring result of said CCD camera is delivered to a computer which continuously compares the measuring result with a preset reference level and produces an alarm if the deviation of the measuring result from the reference level exceeds a preset fluctuation range.

3. An apparatus as set forth in claim 2, wherein the apparatus is a quality control apparatus for newspaper printing.

4. An apparatus as set forth in claim 1, wherein said light from the printing surface travels in a first direction, is laterally deflected by said third mirror to one of said opposing mirrors, is reflected between said opposing mirrors, and is received by said camera on a lateral side of said girder.

5. An apparatus as set forth in claim 4, wherein said angular variation is between about 2-5 degrees.

6. An apparatus as set forth in claim 4, wherein said camera is within a protective hood attached to said girder.

7. An apparatus as set forth in claim 1, wherein said light from the printing surface travels in a first direction through an opening in said girder, is laterally deflected by said third mirror to one of said opposing mirrors, is reflected between said opposing mirrors, and is deflected by a fourth mirror to generally resume said first direction and exits said girder at an opposite side from said opening in said girder.

8. An apparatus as set forth in claim 7 wherein said angular variation is between about 2-5 degrees.

9. An apparatus as set forth in claim 7, wherein said camera is within a protective hood attached to said girder.

10. An apparatus as set forth in claim 1, wherein said angular variation is between about 2-5 degrees.

11. An apparatus as set forth in claim 1, wherein said camera is within a protective hood attached to said girder.

* * * * *